No. 704,099. Patented July 8, 1902.
O. H. & A. F. PIEPER.
ELECTRIC MOTOR REGULATION.
(Application filed Mar. 24, 1899.)
(No Model.)
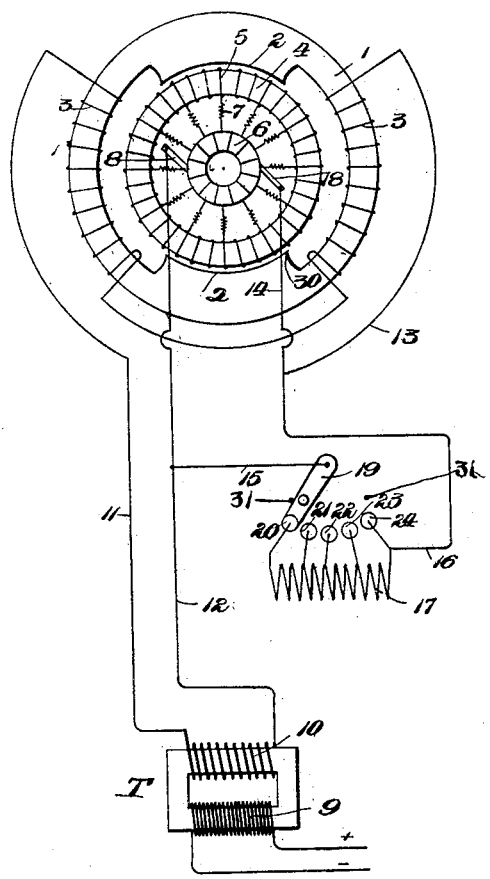
Witnesses.
Walter B. Payne.
G. Willard Rich.
Inventors.
Oscar H. Pieper
Alphonse F. Pieper
by Church & Church
their Attorneys.

UNITED STATES PATENT OFFICE.

OSCAR H. PIEPER AND ALPHONSE F. PIEPER, OF ROCHESTER, NEW YORK.

ELECTRIC-MOTOR REGULATION.

SPECIFICATION forming part of Letters Patent No. 704,099, dated July 8, 1902.

Application filed March 24, 1899. Serial No. 710,366. (No model.)

*To all whom it may concern:*

Be it known that we, OSCAR H. PIEPER and ALPHONSE F. PIEPER, of Rochester, in the county of Monroe and State of New York, have invented certain new and useful Improvements in Electric-Motor Regulation; and we do hereby declare the following to be a full, clear, and exact description of the same, reference being had to the accompanying drawing, forming a part of this specification, and to the reference-numerals marked thereon.

Our present invention relates to electric motors adapted for alternating currents and to certain improvements relating to and means for and method of controlling them whereby they may be started with the necessary torque, and when the armature is under full speed it can be instantly stopped and, if desired, its direction of movement reversed without the use of clutches, brakes, or other mechanical holding devices.

The invention, which is designed more particularly for small motors intended for operating dental engines or machines where accurate speed regulation is the leading requisite, relates to alternating-current motors of the direct-current type having the usual laminated field-magnets and the windings designed for a relatively high electromotive force or relatively high self-induction, armature-coils designed for a relatively low electromotive force or having a relatively low self-induction, commutator and commutator-brushes arranged at the neutral point, said field and armature windings being connected in series; and the novel features of the invention relate to the control of such motors at any speed and with or without a load by a permanent shunt around the armature, and the accurate regulation of the motor is accomplished by the manipulation of a variable resistance interposed in said shunt.

The drawing shows a diagrammatic view illustrating our motor and the means for regulating the same.

In the motor shown in the drawing, 1 indicates a laminated field-magnet of the ring type, having the pole-pieces 2 and the field-windings 3, designed for a relatively high electromotive force or relatively high self-induction.

4 indicates the armature provided with the armature-coils 5, designed for a relatively low electromotive force or having a relatively low self-induction, said coils being connected at intervals with section 6 of the commutator, the connection with the armature-coils being through resistance-coils 7, interposed between the commutator-sections and armature-coils. In practice the coils 7 are wound symmetrically around the armature, making the windings symmetrical, distributing uniformly the heating, and facilitating the construction.

8 and 18 indicate the commutator-brushes, coöperating with the commutator and arranged to contact with the coils which are in the neutral point of the magnet, being at an angle of ninety degrees to the axis of the poles.

In the drawing the source of current for supplying the motor is a transformer, (indicated by T,) the primary coil 9 being in the high-tension circuit and the secondary coil 10 being connected by wire 11 with one of the field-coils, the other conductor 12 leading to the brush 8.

13 indicates a wire leading from the field-coil and to which the brush 18 is connected by wire 14, and a shunt is formed between the conductor 13 and the conductor 12, embodying the conductors 15 and 16, resistance-coils 17, and a movable switch-arm 19, coöperating with the contacts 20 21 22 23, connected to coils of the variable resistance and also with the contact 24, connected directly to conductor 16. The arm 19 coöperates at the extremes of movement with the pins 31, which are so arranged that the shunt between the armature-terminals is permanent and is never opened entirely whether the motor is operating at full speed or is at rest, although the resistance is capable of variation to vary the speed.

While it is impracticable to state exactly the proper ratio or relation existing between the ampere-turns in the field and armature coils, as this will vary with different motors and also with the load, we find that the field-magnet windings must have a relatively high self-induction or designed for a relatively high electromotive force—as, for instance, one hundred and ten volts—and the armature-windings a relatively low self-induction or designed for a relatively low electromotive force—as, for instance, about eighteen or twenty volts—or the field might have two hundred ampere-turns and the armature eleven and one-half ampere-turns.

While we have shown a magnet having only two pole-pieces, it is obvious that a multipolar machine could be used.

The field-windings, armature-coils, (excepting the extra resistance-coils 7,) the commutator, and brushes are connected in series, as in constant-current motors, and when the motor is operating at full speed the switch 19 in the shunt engages contact-point 20, so that all the resistance-coils 17 are in the shunt. By moving the switch-arm 19 from this position toward the contact 24 the speed of the motor may be reduced as desired, more and more of the resistance-coils 17 being out of the shunt and a greater portion of current allowed to pass through it; but when the switch reaches the contact 24, the resistance then being all cut out, the machine is short-circuited and brought to an immediate stop, and there is no tendency on the part of the armature to rotate.

It will be understood that the motion of the armature may be reversed by a suitable pole-changer interposed in the conductors leading to the commutator-brushes; but we have not deemed it necessary to specifically show such device.

The function of the resistance in shunt with the armature of a series-wound motor of the direct-current type, which is wound, as stated, for alternating currents, is not only to maintain the voltage at the armature-terminals constant, but permits an armature-winding of relatively low self-induction or few turns, which is necessary in an alternating-current motor of this type to prevent excessive sparking.

We claim as our invention—

1. The combination in a motor for alternating currents, of field-windings, armature-coils, commutator and commutator-brushes arranged at the neutral point, all connected in series, as customary in constant-current motors, and a regulating device for controlling the speed of the motor consisting of a variable resistance permanently in shunt across the armature.

2. The combination in a motor for alternating currents, of field-windings with relatively high self-induction and armature-coils with relatively low self-induction, commutator and commutator-brushes arranged on the neutral point, all connected in series, as customary in continuous-current motors, and a variable resistance in shunt with the armature.

3. The combination in a motor for alternating currents, of field-windings with relatively high self-induction and armature-coils with relatively low self-induction, commutator and commutator-brushes arranged on the neutral point, all connected in series as customary in continuous-current motors, and a regulating device consisting of resistance-coils in shunt to the armature.

4. The combination in a motor for alternating currents, of field-windings with relatively high self-induction, and armature-coils, commutator and commutator-brushes arranged at the neutral point, all connected in series, as customary in constant-current motors, a permanent shunt across the armature-terminals and means for short-circuiting the armature-brushes to arrest the motion of the armature.

5. The combination in a motor for alternating currents, of field-windings and armature-coils adapted for alternating currents, commutator and commutator-brushes arranged at the neutral point, all connected in series, as customary in constant-current motors, and a permanent shunt across the armature.

6. The combination in a motor for alternating currents, of field-windings and armature-coils adapted for alternating currents, commutator and commutator-brushes arranged at the neutral point, all connected in series, as customary in constant-current motors, and a permanent shunt and a variable resistance arranged between the armature-terminals.

7. The combination in a motor for alternating currents, of field-windings designed for a relatively high electromotive force, and armature-coils designed for a relatively low electromotive force, commutator and commutator-brushes arranged on the neutral point as customary in continuous-current motors, and a variable resistance arranged between the armature-terminals.

8. The combination in a motor for alternating currents, of field-windings designed for relatively high self-induction or high electromotive force, armature-coils designed for relatively low self-induction or low electromotive force, commutator and commutator-brushes at the neutral point and all arranged in series, and a variable resistance in shunt across the armature-terminals.

OSCAR H. PIEPER.
ALPHONSE F. PIEPER.

Witnesses:
F. F. CHURCH,
GRACE A. RODA.